United States Patent
Hayakawa et al.

(10) Patent No.: US 6,882,911 B2
(45) Date of Patent: Apr. 19, 2005

(54) VEHICLE SERVICE SUPPORT SYSTEM, SERVER, METHOD, AND PROGRAM

(75) Inventors: Michitaka Hayakawa, Hiroshima (JP); Takahiro Ida, Hiroshima (JP); Shigefumi Hirabayashi, Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 10/652,941

(22) Filed: Aug. 29, 2003

(65) Prior Publication Data

US 2004/0133317 A1 Jul. 8, 2004

(30) Foreign Application Priority Data

| Sep. 30, 2002 | (JP) | ........................................ 2002-285117 |
| Sep. 30, 2002 | (JP) | ........................................ 2002-285128 |

(51) Int. Cl.[7] .............................................. G06F 7/00
(52) U.S. Cl. ............................. 701/29; 701/30; 701/36; 340/905
(58) Field of Search ............................. 701/29, 30, 35, 701/36; 342/357.09; 709/206; 340/905

(56) References Cited

U.S. PATENT DOCUMENTS

| 6,603,406 | B1 | * | 8/2003 | Jambhekar et al. | .......... 340/905 |
| 6,804,516 | B1 | * | 10/2004 | Choi | .................. 340/286.02 |
| 2002/0198660 | A1 | * | 12/2002 | Lutter et al. | ............... 701/301 |
| 2003/0109972 | A1 | * | 6/2003 | Tak | ............................. 701/29 |
| 2004/0019645 | A1 | * | 1/2004 | Goodman et al. | ........... 709/206 |

FOREIGN PATENT DOCUMENTS

| JP | 2002-073852 | 3/2002 |
| JP | 2002-127877 | 5/2002 |

* cited by examiner

Primary Examiner—Gertrude A. Jeanglaude
(74) Attorney, Agent, or Firm—Brooks Kushman P.C.

(57) ABSTRACT

Service information of a vehicle owned by a first user is provided through a communication line to a second user specified by the first user, and the second user is allowed to input a reply to a reply item about the service information.

26 Claims, 11 Drawing Sheets

FIG.13

| Service history<br>·10/15/2001: Engine oil<br>    exchanged(35000km)<br>·12/28/2001: Break pad<br>    exchanged(36000km)<br>·12/28/2001: Tires worn<br>    (but not exchanged) | Working conditions<br>·Mileage: 40000km |
|---|---|
| | Failure history |

FIG.14

Service need portions are:     Estimated cost : ¥99550

①Steering
   ・◯No service need portions.

②In engine room
   ・△Engine oil: The engine oil is degraded and we suggest exchange.

[Detail] [Requested] [Unrequested] [Advice] [Entrustment]
   Exchange cost: ¥2000           [Assist interaction]

③◯·······

[End] [Next] [Before]

VEHICLE SERVICE SUPPORT SYSTEM, SERVER, METHOD, AND PROGRAM

BACKGROUND OF THE INVENTION

The present invention relates to a vehicle service support system, a vehicle service support server, a vehicle service support method and a vehicle service support program for enabling a user to remotely make a reply about service information. More specifically, it relates to a system, a server, a method and a program for transmitting service information of a vehicle to a user through a communication line and receiving a reply to a reply item about the service information through the communication line from the user.

In general, when a user of a vehicle requests vehicle service of a service shop (including a repair shop and the like), the service (such as part exchange, adjustment, repair and the like) is arranged as follows: First, the user takes the vehicle to the service shop and have the vehicle checked by the service staff. After the check, the user is explained about the content of the service so as to understand the service content. Thereafter, the user decides whether or not the service is requested, and then actually requests the service.

As a system in which a user thus ascertains the content of the service in a service shop, the following two systems are conventionally known: In one system, a printer is installed in a waiting room of a service shop, so that the printer can output the content and estimate of necessary service found in the check carried out by the service staff (as described in, for example, Japanese Laid-Open Patent Publication No. 2002-127877). In the other system, information processing equipment including a camera device, a voice instruction device and a printer is installed in a service shop, and an actual image of a vehicle captured by a user with the camera device is transmitted to a remote repair shop, so that the content of repair can be decided in the repair shop and the content and estimate of the repair can be output from the printer (as described in Japanese Laid-Open Patent Publication No. 2002-73852). In this manner, in any of the conventional systems, the content of the service is output from a printer installed in a service shop.

In contrast, a system in which the content of the service is transmitted to a user terminal installed at a house of a user or the like through a communication line such as the internet is possible. In this system, a user can remotely grasp the content of the service without being in a service shop. Also, when information whether or not the service is requested can be transmitted from the user terminal to the service shop in this system, the user can request for vehicle service without any time and locational restrictions, which will largely improve the convenience for the user.

In the system in which a user decides whether or not the service is requested after ascertaining the content of the service, however, if the user has little knowledge of vehicle mechanics, it is difficult for the user to decide whether or not to request the service even if the content of the service is explained. Therefore, such a user wants to be supported in the decision by, for example, a friend or the like. In order to be supported by a friend, the friend needs to grasp the content of the service.

For example, in the case where a user ascertains the content of the service in the presence of the service staff in a service shop, a user with little knowledge of vehicle mechanics can take his/her friend to the service shop to be explained about the content of the service together. Thus, the friend can grasp the content of the service, and hence, can support the user in the decision whether or not the service is requested.

In the case where a user remotely ascertains the content of the service through a communication line, however, a friend of the user is generally away from the user. Therefore, the user having been explained about the content of the service has to explain the content to the friend on the phone or the like. However, it is difficult for the user with little knowledge of vehicle mechanics to explain the content. Therefore, it is difficult for the friend to accurately grasp the content of the service, and hence, the friend cannot appropriately support the user.

In this manner, in the system in which a user ascertains the content of the service by using a communication line, it is necessary to provide a new system in which even a user with little knowledge of vehicle mechanics can be easily supported by a friend so as to appropriately decide whether or not to request the service.

SUMMARY OF THE INVENTION

The present invention was devised in consideration of these circumstances, and an object of the invention is, in the case where a user remotely ascertains service information of a vehicle and remotely makes a reply about the service, enabling a friend of the user to easily support the user.

The vehicle service support system of this invention is a system including a computer apparatus connected to a communication line for executing information processing online.

In this system, the computer apparatus includes a specifying section for allowing a first user that owns the vehicle to specify and input a second user different from the first user; an information providing section for providing the second user specified by the first user with service information of the vehicle of the first user through the communication line; and a reply inputting section for allowing the second user having been provided with the service information to input a reply to a reply item about the service information.

In this architecture, when the first user that owns the vehicle specifies and inputs the second user, the second user specified by the first user is provided with the service information of the vehicle of the first user. Therefore, the second user can ascertain the service information. In this manner, the service information is provided to the second user directly through the communication line and not through the first user. Accordingly, the second user can accurately grasp the content of the service information. On the other hand, since there is no need for the first user to explain the service information to the second user, the burden of the first user is reduced.

The second user inputs a reply to the reply item about the provided service information. When the reply input by the second user is stored as a user reply about the service information, it can be said that the second user makes a reply to the reply item in place of the first user. As a result, even if the first user has little knowledge of vehicle mechanics, the second user can appropriately make a reply about the content of the service.

The computer apparatus may further include a reply providing section for providing the first user with the reply having been input by the second user through the communication line, and the reply inputting section may allow the first user having been provided with the reply to input a reply to the reply item about the service information and store the reply input by the first user as a user reply about the service information.

In this architecture, the reply input by the second user is provided to the first user. Therefore, the first user can ascertain the reply from the second user. The first user inputs a reply to the reply item about the service information by referring the reply from the second user. Then, the reply input by the first user is stored as a user reply about the service information. Therefore, the first user can appropriately make a reply about the content of the service.

The service information can be at least one of service content information obtained as a result of check of the vehicle performed by service staff, information on a regular check of the vehicle, and repair content information for repairing a failure having occurred in the vehicle.

Specifically, the service content information obtained as a result of a check of the vehicle performed by service staff is information of the content of service obtained as a result of the check actually performed, by the service staff, on the vehicle having been taken to a service shop. This service information may be provided to the user when the check performed by the service staff is completed. In this case, the reply item is, for example, whether or not a portion having been determined to be necessary to service by the service staff is requested.

Furthermore, the information on a regular check of the vehicle is, for example, a notice that the regular check time is near. This service information may be provided to the user when the regular check time is near. In this case, the reply item is, for example, whether or not the regular check is requested.

Moreover, the repair content information for repairing a failure having occurred in the vehicle is, for example, information on a failure detected through remote failure diagnosis before taking the vehicle to the service shop and information on repair of the failure. This service information may be provided to the user when a failure is detected. In this case, the reply item is, for example, whether or not the repair of the failure is requested.

The computer apparatus may further include a permission notice transmitting section for transmitting, through the communication line, a notice for permitting to browse a service information window to the second user specified by the first user, and the information providing section may provide the service information window to the second user in response to a browse request from the second user having received the notice.

In this manner, the notice of browse permission is not sent to a person other than the specified second user. Therefore, a user other than the second user cannot browse the service information window. On the other hand, the notice of browse permission is sent to the specified second user, and hence, the second user can remotely ascertain the service information by making a browse request. Thus, the security can be ensured. Also, the second user can make a browse request based on the notice of browse permission at his/her own convenience. Therefore, the second user can ascertain the service information in the service information window without any time and locational restrictions. In the case where this system utilizes the internet technology, the notice of browse permission can be an e-mail including a URL accessible to the service information window. Also, the service information window is preferably built so that a reply about the service information can be input therein.

The information providing section may provide working conditions of the vehicle in addition to the service information to the second user. Herein, a specific example of the working conditions of the vehicle is the mileage of the vehicle.

Thus, the second user, namely, the user that is not the owner of the vehicle related to the service information, can grasp the working conditions of the vehicle. The second user can appropriately make a reply to the reply item about the service information by referring to the working conditions. When, for example, the service history and the failure history of the vehicle are also provided to the second user, the second user can more appropriately make a reply to the reply item.

The computer apparatus may further include an interaction assisting section for allowing the second user and the first user to interact with each other through the communication line in response to a request from the second user having been provided with the service information.

Thus, the second user can directly interact with the first user if necessary, and hence can appropriately make a reply to the reply item.

The reply inputting section may inhibit the second user from inputting a reply to a given reply item out of all reply items about the service information and allow the first user to input a reply to the given reply item to which the second user is inhibited from replying.

The given reply item may be a date of taking the vehicle to a shop where the vehicle is to be serviced.

In the case where the service information obtained before taking the vehicle to the service shop (such as the above-described notice of regular check and repair content information about a repair) is provided to a user, reply items about the service information include, in addition to whether or not the regular check or the repair is requested, a date of taking the vehicle to the service shop. This date can be determined by the owner of the vehicle alone and cannot be determined by the second user, that is, a third party. Therefore, preferably, the second user is inhibited from inputting a reply to a predetermined reply item but the first user is allowed to input a reply to this inhibited predetermined reply item. The predetermined reply item may be a cost (including an estimated cost) of the service apart from the date of taking the vehicle to the service shop.

When a user asks his/her friend for support, he/she generally asks advice from the friend or entrusts determination to the friend in accordance with the content of the support. Therefore, when the vehicle service support system is built as a system in which the user can set the role of the friend and processing is executed in accordance with the role, the convenience for the user will be further improved.

Therefore, the specifying section may allow the first user to specify and input the second user different from the first user and allow the first user to set a role of the specified second user as an adviser for asking for advice about a reply to the reply item or an entrusted person for entrusting a reply to the reply item, and the computer apparatus may further include a reply processing section for processing the reply input by the second user in accordance with the set role of the second user.

In this architecture, when the first user that owns the vehicle specifies and inputs the second user, the first user sets the role of the specified second user if necessary. The role can be an adviser that is asked for advice about the reply item or an entrusted person to whom a reply to the reply item is entrusted.

When the second user whose role has been thus set inputs a reply to the reply item about the service information, the reply is processed in accordance with the set role of the second user.

In this manner, in the system in which the user ascertains the service information through the communication line, a friend of the user can easily support the user in accordance with the set role.

The reply processing section may provide, when the role of the second user is set as an adviser, the reply input by the second user to the first user through the communication line, allow the first user having been provided with the reply from the second user to input a reply to the reply item and store the reply input by the first user as a user reply about the service information.

When the role of the second user is set as an adviser, the first user asks for advice from the second user about the reply to the reply item. Therefore, the reply input by the second user is provided to the first user through the communication line. Thus, the first user can grasp the advice of the second user. The first user thus provided with the reply from the second user inputs a reply to the reply item about the service information by referring the reply from the second user. The reply input by the first user is stored as a user reply.

Since the stored reply is a reply from the user to the service shop where the vehicle is to be serviced, the service shop can actually provide service in accordance with the stored reply.

The reply processing section may store the reply input by the second user as a user reply about the service information when the role of the second user is set as an entrusted person.

When the role of the second user is set as an entrusted person, the first user entrusts a reply to the reply item to the second user. Therefore, the reply input by the second user is stored as a user reply. Since the stored reply is a reply from the user to the service shop, the service shop can actually provide service in accordance with the stored reply.

In this manner, the processing is executed in accordance with the role of the second user set by the first user, so that the convenience for the first user can be improved.

The reply processing section may inhibit the first user from inputting a reply to the reply item when the role of the second user is set as an entrusted person.

If the first user inputs a reply to the reply item when the role of the second user is set as an entrusted person, the reply from the first user can be different from the reply from the second user. Therefore, when the role of the second user is set as an entrusted person, the first user is inhibited from inputting a reply. Thus, inconsistency between the two replies, namely, inconsistency between replies from the users to the service shop, can be avoided.

The information providing section may provide the first user with the service information about the vehicle of the first user through the communication line, and the specifying section may allow the first user to specify the second user and a role of the specified second user after providing the service information to the first user.

Thus, the first user can specify the second user and set the role of the second user after ascertaining the service information about his/her own vehicle. Therefore, the first user can specify a second user suitable to the service information and can properly set the role of the specified second user.

When there are a plurality of reply items, the specifying section may allow the first user to specify different second users with respect to the plurality of reply items and specify different roles with respect to the different second users.

Thus, the first user can specify a user suitable to each reply item. It goes without saying that the first user can specify one user (second user) with respect to all the reply items.

The specifying section may inhibit the first user from specifying the roles of the second users as an entrusted person with respect to all of the plurality of reply items.

The specifying section may inhibit the first user from specifying the role of the second user as an entrusted person with respect to a reply item of a date of taking the vehicle to a shop where the vehicle is to be serviced.

This is because, as described above, the date of taking the vehicle to the service shop can be determined by the owner of the vehicle alone but cannot be determined by the second user, that is, a third party.

The other vehicle service support system of this invention is a system for enabling a user to remotely reply about service information of a vehicle through a communication line in which service information of the vehicle is transmitted to the user through the communication line and a reply to a reply item about the service information is received from the user through the communication line.

This system includes specifying means for allowing a first user that owns the vehicle to specify and input a second user different from the first user; information providing means for providing the second user specified by the first user by using the specifying means with the service information of the vehicle of the first user through the communication line; and reply inputting means for allowing the second user having been provided with the service information to input a reply to a reply item about the service information.

The specifying means may allow the first user to specify and input the second user different from the first user and allow the first user to set a role of the specified second user as an adviser for asking for advice about a reply to the reply item or as an entrusted person for entrusting a reply to the reply item, and the vehicle service support system may further include reply processing means for processing the reply input by the second user in accordance with the set role of the second user.

The vehicle service support server of this invention is a server connected to a remote terminal through a communication line for enabling a user to remotely reply about service information of a vehicle.

This server includes a specifying section for allowing a first user that owns the vehicle to specify and input a second user different from the first user in a first remote terminal operated by the first user; an information providing section for providing a second remote terminal operated by the second user specified by the first user with the service information of the vehicle of the first user through the communication line; and a reply inputting section for allowing the second user having been provided with the service information to input a reply to a reply item about the service information in the second remote terminal.

The specifying section may allow the first user to specify and input the second user different from the first user and allow the first user to set a role of the specified second user as an adviser for asking for advice about a reply to the reply item or as an entrusted person for entrusting a reply to the reply item, and the vehicle service support server may further include a reply processing section for processing the reply input by the second user in accordance with the set role of the second user.

The vehicle service support method of this invention is a method for enabling a user to remotely reply about service information of a vehicle through a communication line.

This method includes a specifying step of allowing a first user that owns the vehicle to specify and input a second user different from the first user; an information providing step of providing the second user specified by the first user with the service information of the vehicle of the first user through the communication line; and a reply inputting step of allowing the second user having been provided with the service information to input a reply to a reply item about the service information.

In the specifying step, the first user may be allowed to specify and input the second user different from the first user and be allowed to set a role of the specified second user as an adviser for asking for advice about a reply to the reply item or as an entrusted person for entrusting a reply to the reply item, and the vehicle service support method may further include a reply processing step of processing the reply input by the second user in accordance with the set role of the second user.

The vehicle service support program of this invention is a program for controlling a vehicle service support apparatus connected to a communication line for enabling a user to remotely reply about service information of a vehicle.

This program makes the vehicle service support apparatus execute specifying processing for allowing a first user that owns the vehicle to specify and input a second user different from the first user; information providing processing for providing the second user specified by the first user with the service information of the vehicle of the first user through the communication line; and reply inputting processing for allowing the second user having been provided with the service information to input a reply to a reply item about the service information. In the specifying processing, the first user may be allowed to specify and input the second user different from the first user and be allowed to set a role of the specified second user as an adviser for asking for advice about a reply to the reply item or as an entrusted person for entrusting a reply to the reply item, and the vehicle service support program may further make the vehicle service support apparatus execute reply processing for processing the reply input by the second user in accordance with the set role of the second user.

BRIEF DESCRIPTION OF THE DRAWINGS

FIG. 13 is a diagram for showing an example of a reference data display window displayed on a display of a user terminal;

FIG. 14 is a diagram for showing an example of a service content explanation window displayed on a display of a user terminal;

DETAILED DESCRIPTION OF THE INVENTION

A preferred embodiment of the invention will now be described with reference to the accompanying drawings.

Figure 1:
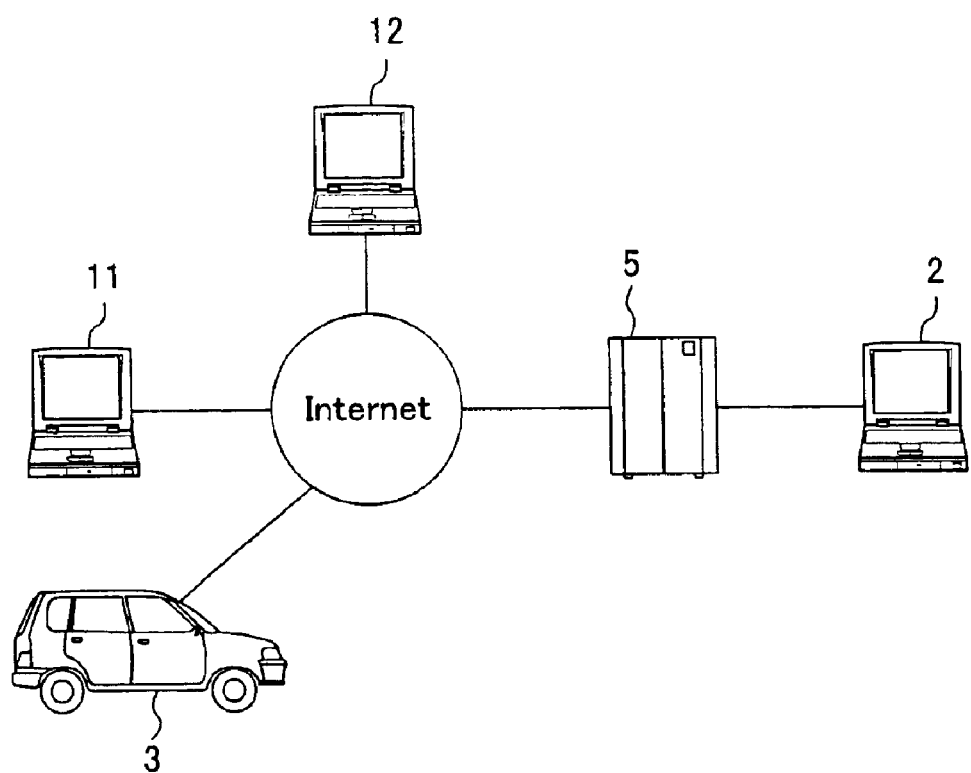
FIG. 1 is a schematic diagram for showing the architecture of a vehicle service support system according to an embodiment of the invention.

FIG. 1 shows the schematic architecture of a vehicle service support system according to an embodiment of the invention. This vehicle service support system includes a first user terminal 11 operated by a first user that is an owner of a vehicle 3 (hereinafter referred to as the user A), a second user terminal 12 operated by a second user that is a friend or the like of the user A (hereinafter referred to as the user B), a service staff terminal 2 operated by service staff that checks and services (for example, maintains or repairs) the vehicle 3, and a vehicle service support server 5 to which the user terminals 11 and 12 and the service staff terminal 2 are connected through communication lines such as internet (network).

Also, the vehicle 3 is equipped with a mobile device (not shown) that performs various sensing and transmits data detected by the sensing to the vehicle service support server 5 through the internet.

Each of the user terminals 11 and 12 is a personal computer installed at a house or the like of the user in this embodiment but may be a cellular phone or a portable information terminal (such as a PDA) carried by the user.

Similarly, the service staff terminal 2 is also a personal computer installed in a service shop (including a repair shop or the like) where the vehicle 3 is checked and serviced but may be a cellular phone or a portable information terminal carried by the service staff.

Figure 2:
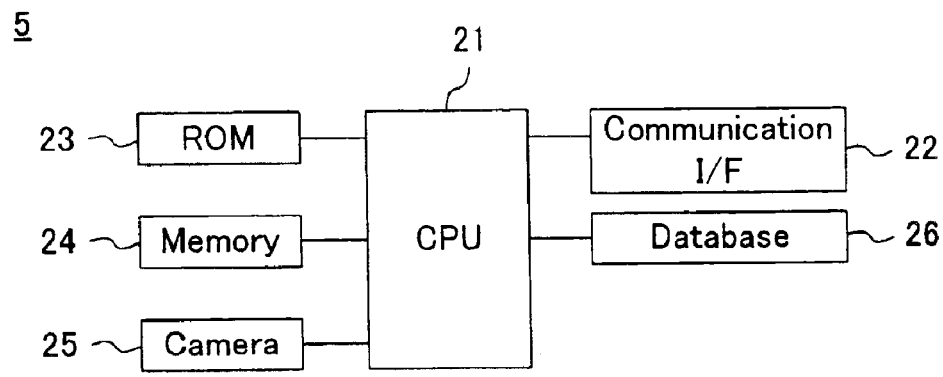
FIG. 2 is a block diagram for showing the architecture of a vehicle service support server.

The vehicle service support server 5 is a server computer installed in the service shop, and includes, as shown in FIG. 2, a CPU 21 for executing control processing of a variety of signals. The CPU 21 is connected, for receiving and sending signals, to a communication interface 22 for communicating with the user terminals 11 and 12, the service staff terminal 2 and the vehicle 3, a ROM (recording medium) 23 in which a vehicle service support program or the like for controlling the vehicle service support server 5 is recorded, a memory 24 for storing various information, a camera 25 and a database 26 in which various information is stored.

The camera 25 is used for capturing an actual image of a service need portion corresponding to a check item that is determined by the service staff to be necessary or preferred to be serviced (for part exchange, adjustment, repair or the like) on the basis of check results obtained by checking respective check items of the vehicle 3 of the user. The captured actual image is used for presenting the service need portion to the user.

Although the vehicle service support server 5 is installed in the service shop in this embodiment, it may be operated outside the service shop by another operator.

The database 26 previously stores a variety of display windows (such as a service content explanation window described below) to be displayed on the user terminals 11 and 12 when the content of a failure or service is transmitted and explained to the user through the communication line or when a notice of regular check is transmitted. Also, the database 26 stores, with respect to each user, information on the service history of the vehicle 3, information on the failure history and information on the working conditions such as the mileage.

Figure 3:
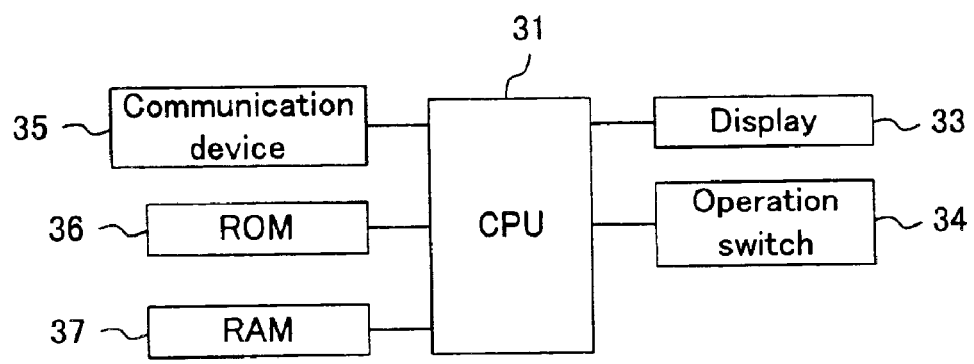
FIG. 3 is a block diagram for showing the architecture of a user terminal.

On the other hand, each of the user terminals 11 and 12 includes, as shown in FIG. 3, a CPU 31 for executing control processing of various signals. The CPU 31 is connected, for receiving and sending signals, to a display 33 for displaying various information, an operation switch 34 to be operated by the user, a communication device 35 for sending/receiving signals to/from the communication interface 22 of the vehicle service support server 5, a ROM 36 in which a program or the like for controlling the user terminal 11 or 12 is recorded, and a RAM 37 for temporarily storing various information and the like.

Figure 4:
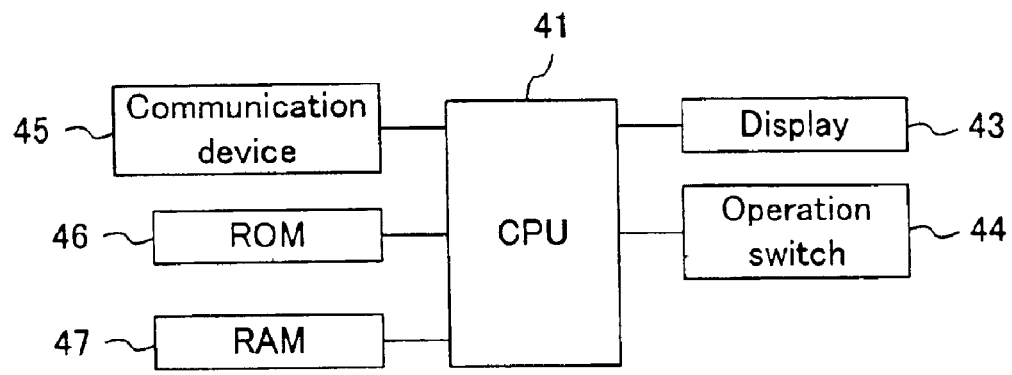
FIG. 4 is a block diagram for showing the architecture of a service staff terminal.

Also, the service staff terminal 2 includes, as shown in FIG. 4, a CPU 41 for executing control processing of various signals in the same manner as the user terminals 11 and 12. The CPU 41 is connected, for receiving and sending signals, to a display 43, an operation switch 44 to be operated by the service staff, a communication device 45 for sending/receiving signals to/from the communication interface 22 of the vehicle service support server 5, a ROM 46 in which a program or the like for controlling the service staff terminal 2 is recorded, and a RAM 47 for temporarily storing various information and the like.

The CPU 21 of the vehicle service support server 5 transmits the service information of the vehicle 3 to the user through the communication line by using the vehicle service support program and receives a reply about the service information from the user through the communication line as described below. By thus transmitting the service information of the vehicle 3 to the user through the communication line and receiving the reply about the service information from the user through the communication line, the vehicle service support server 5 constructs a vehicle service support apparatus for enabling the user to remotely make a reply about the service information.

Figure 5:
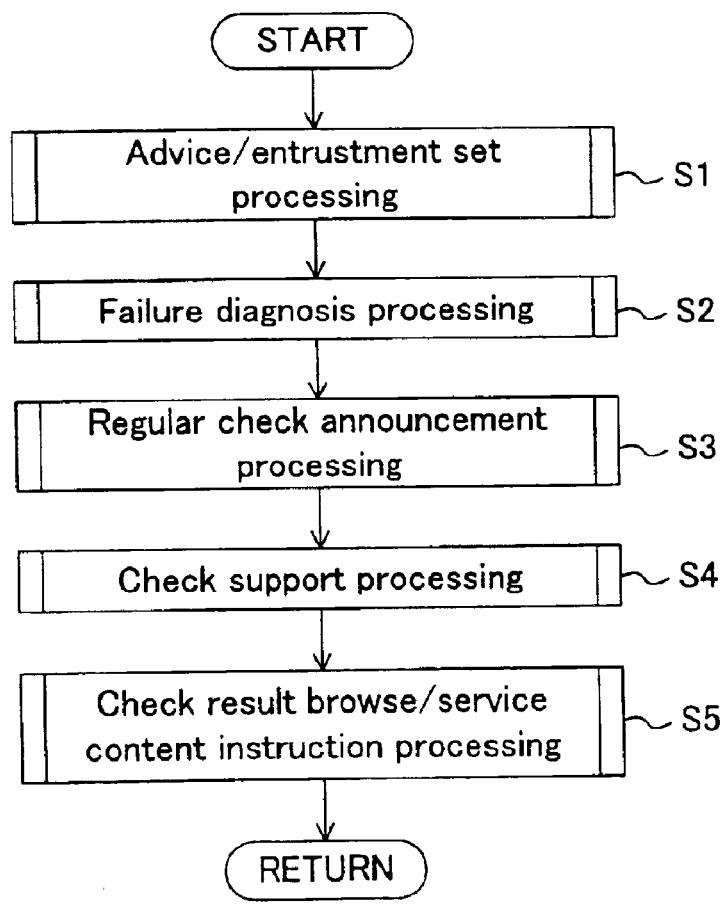
FIG. 5 is a flowchart for showing processing executed by a CPU of the vehicle service support server.

The specific processing executed by the CPU 21 will now be described with reference to a flowchart shown in FIG. 5. Advice/entrustment set processing is executed in first step S1, and failure diagnosis processing is executed in subsequent step S2. Regular check announcement processing is executed in step S3, check support processing is executed in step S4, and check result browse/service content instruction processing is executed in step S5, and then, the flow returns.

Next, each of the aforementioned processing will be described in detail. In the advice/entrustment set processing executed in step S1, the user A previously sets a third party (corresponding to the user B) for asking for advice (as the role of an adviser) or for entrusting a reply (as the role of an entrusted person) about determination of request for repair, regular check or service to be provided based on check result. Specifically, the advice/entrustment set processing is executed before the occurrence of a failure, time of regular check, or informing the result of check actually performed by the service staff.

In this advice/entrustment set processing, an advice/entrustment set window stored in the database 26 is displayed on the display 33 of the user terminal 11 in response to a request from the user terminal 11 operated by the user A.

Figure 11:
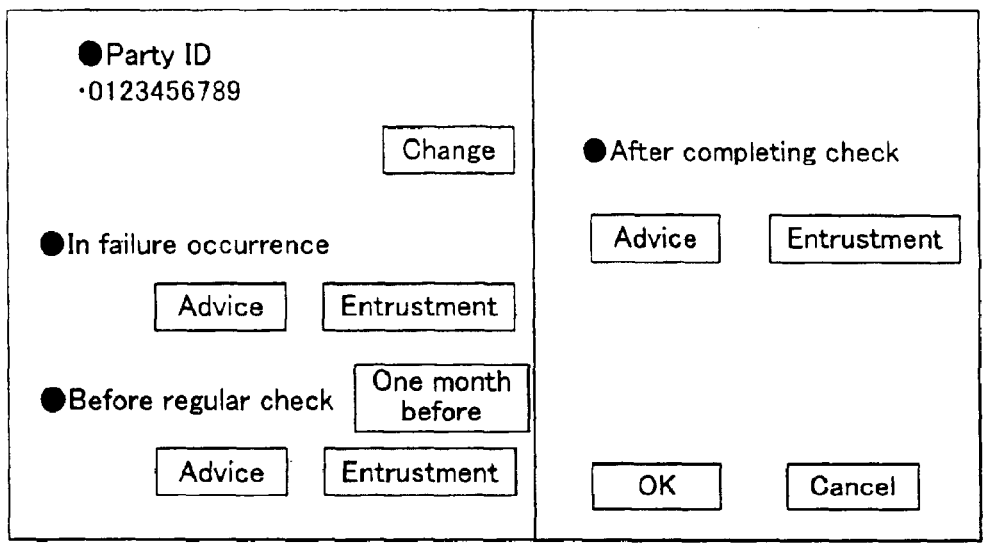
FIG. 11 is a diagram for showing an example of advice/entrustment set window displayed on a display of a user terminal.

In the advice/entrustment set window, an item "party ID" for specifying a third party for asking for advice or entrusting is displayed, for example, as shown in FIG. 11. In this item, the ID of a currently specified third party (which is "0123456789" in the drawing and is a blank when no third party is specified) is displayed, and when the user A operates a "change" button, a new third party can be specified.

Also in the advice/entrustment set window, three items of "in failure occurrence", "before regular check" and "after completing check" are displayed, and an "advice" button and an "entrustment" button are displayed with respect to each of these items for setting the role of the specified third party (user B). The user A can set the role of the user B specified individually with respect to the items "in failure occurrence", "before regular check" and "after completing check".

Specifically, when the user A operates the "advice" button in each of the items, the role of the user B is set as an adviser, and when the user A operates the "entrustment" button, the role of the user B is set as an entrusted person. Also, when the user A operates neither the "advice" button nor the "entrustment" button, the role of the user B is not set.

In the item "before regular check", the time when the user is to receive a notice of regular check time can be set (which is exemplarily set to one month before the date of regular check in the drawing).

When the user A operates an "OK" button in the advice/entrustment set window, the contents set in the advice/entrustment set window are stored in the database 26, and the advice/entrustment set processing is completed.

Although merely one third party is specified in this advice/entrustment set window, different third parties may be specified for the respective items "in failure occurrence", "before regular check" and "after completing check". Also, in the case where the role is set as an adviser, a plurality of third parties may be specified for one item.

In the failure diagnosis processing executed in step S2, the failure diagnosis of the vehicle 3 is remotely performed on the basis of detection data transmitted from a control unit of the vehicle 3, and when a failure is found, the user is informed of the failure. Also, in this failure diagnosis processing, the user inputs whether or not repair of the failure is requested.

Figure 6:
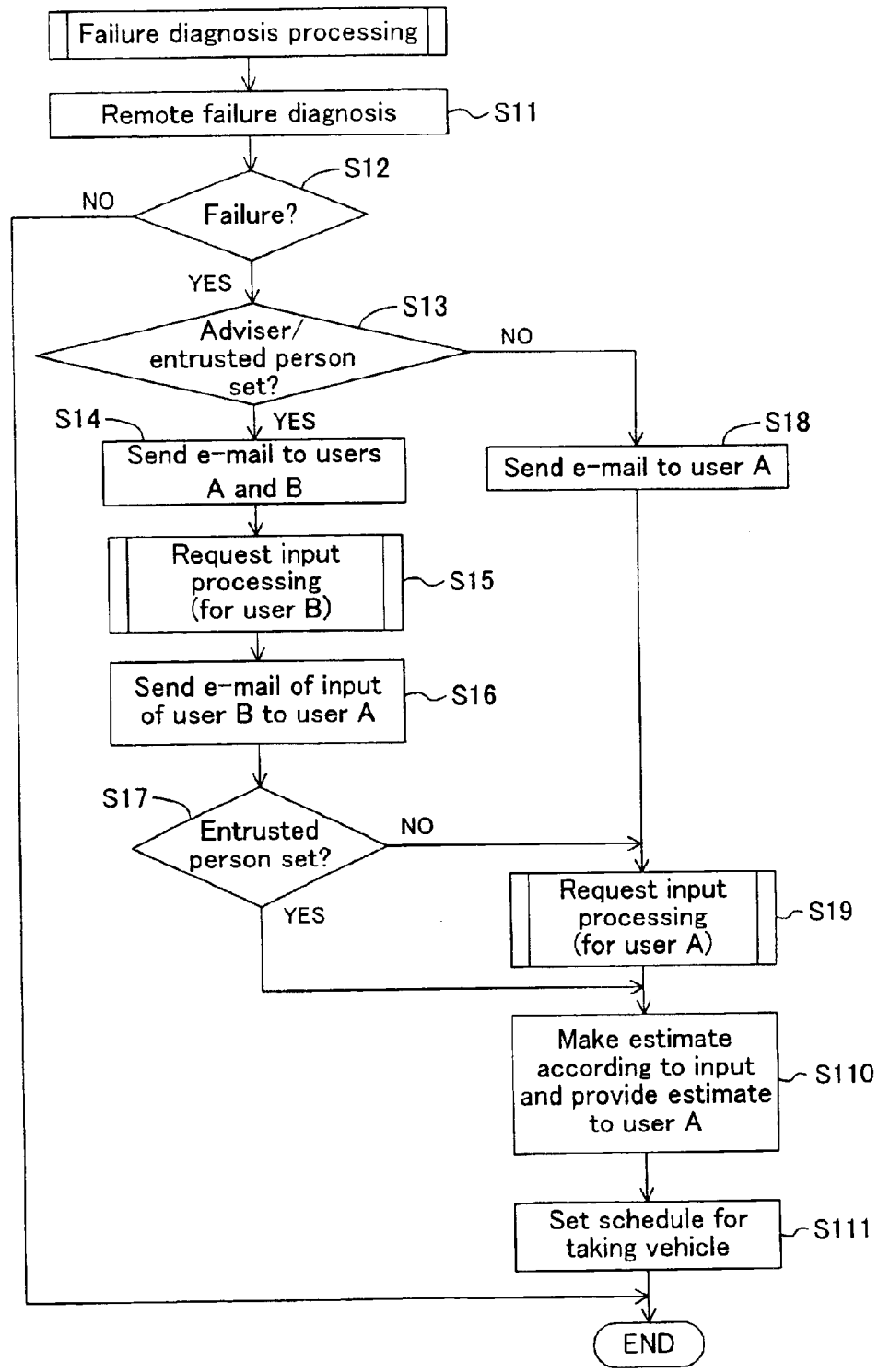
FIG. 6 is a flowchart for showing details of failure diagnosis processing.

Details of the failure diagnosis processing will now be described with reference to a flowchart shown in FIG. 6. In step S11, remote failure diagnosis for remotely performing failure diagnosis of the vehicle 3 is executed as described above. In subsequent step S12, failure determination is performed on the basis of the result of the diagnosis executed in step S11. When NO, namely, when no failure is found, the processing is completed, and when YES, namely, when any failure is found, the flow proceeds to step S13.

In step S13, it is determined whether or not an adviser or an entrusted person is set for the item "in failure occurrence" in the advice/entrustment set processing. When YES, namely, when either is set, the flow proceeds to step S14, and when NO, namely, when neither is set, the flow proceeds to step S18.

In step S14, a failure occurrence e-mail is sent to both the user A and the user B. This failure occurrence e-mail is a notice for permitting to browse a failure content explanation window and includes a URL. When the user makes an access to this URL, the failure content explanation window can be browsed.

In subsequent step S15, request input processing is executed. In the request input processing executed in this step, the user B that has been set as the role of an adviser or an entrusted person inputs whether or not the repair of the failure is requested. In this step, the user A cannot input whether or not the repair is requested.

Figure 7:
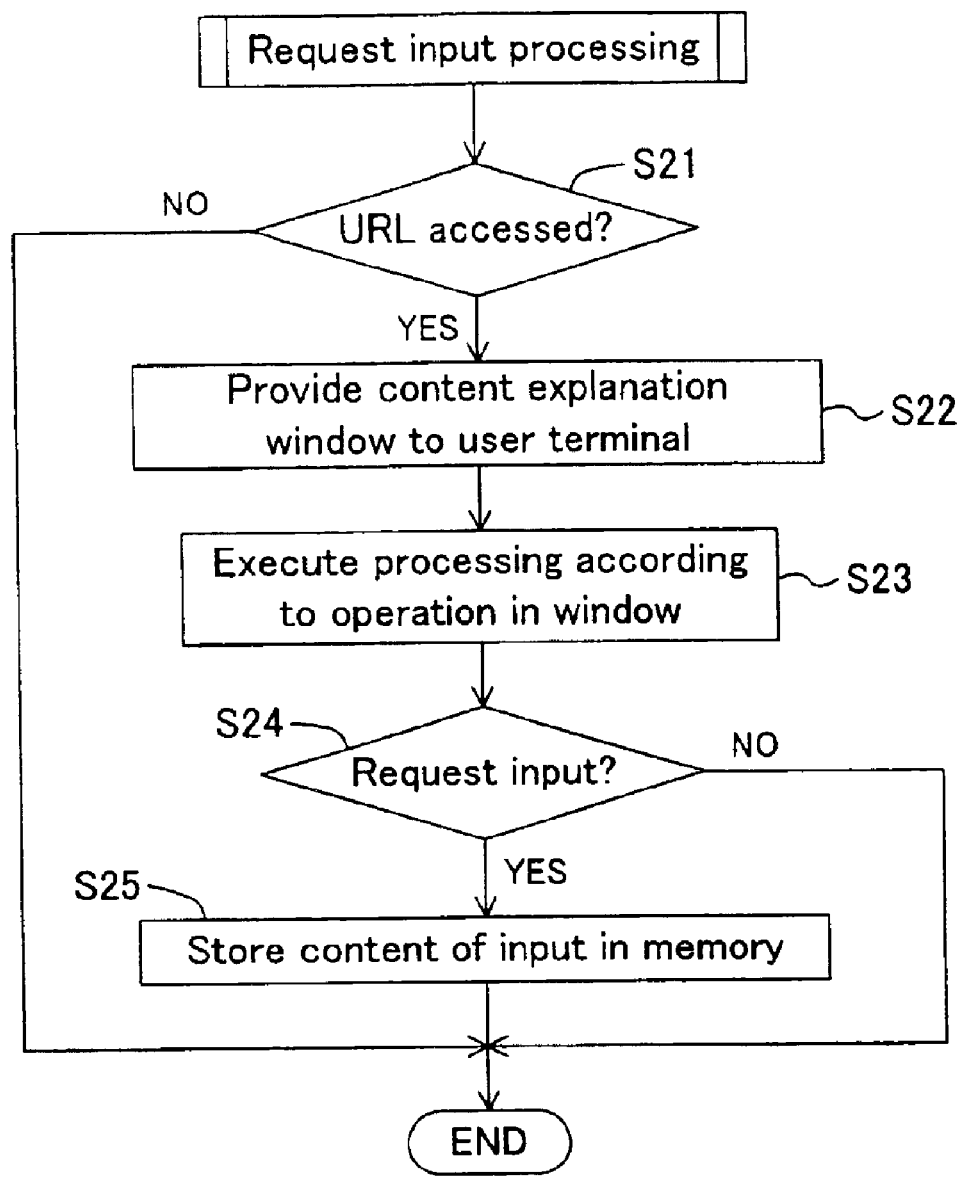
FIG. 7 is a flowchart for showing details of request input processing.

This request input processing is specifically performed in accordance with a flowchart shown in FIG. 7. In step S21, it is determined whether or not an access (a browse request) to the URL included in the failure occurrence e-mail having been sent to the user B in step S14 has been made. When NO, this processing is completed, and when YES, the flow proceeds to step S22, so as to provide the failure content explanation window to the user terminal 12 operated by the user B.

Figure 12:
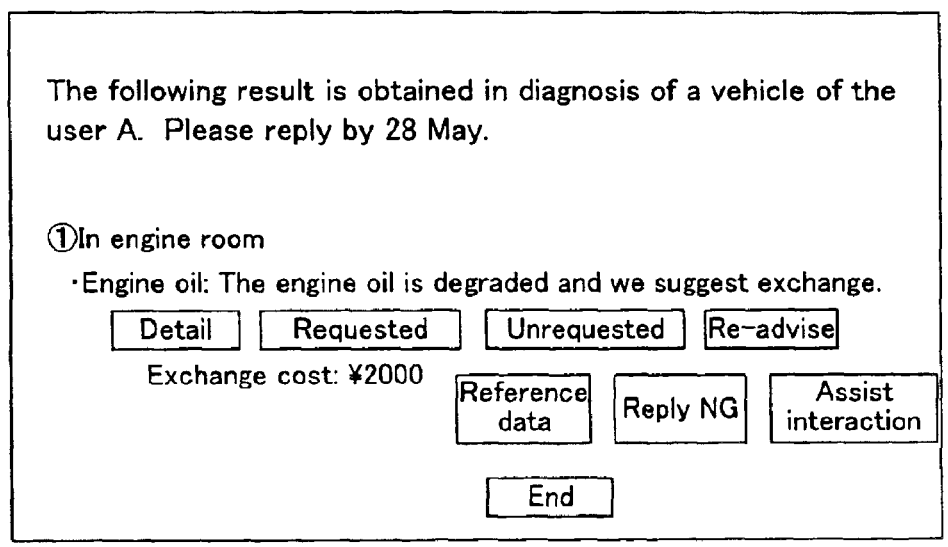
FIG. 12 is a diagram for showing an example of a failure content explanation window displayed on a display of a user terminal.

An example of the failure content explanation window is shown in FIG. 12. This example is a failure content explanation window in which the user B inputs whether or not the repair is requested, and that a failure is found in the vehicle of the user A and brief explanation of the failure are displayed. In each failure item, a "requested" button (that is operated when the service (repair) is requested) and an "unrequested" button (that is operated when the service is not requested), which are used for inputting whether or not the repair (service) is requested; a "reply NG" button that is operated when the user B cannot determine whether or not the repair (service) is requested; a "detail" button; a "reference data" button; an "assist interaction" button; a "re-advise" button; the cost of the service of this failure item and the like are displayed.

When the "detail" button is operated by the user B, a new explanation window regarding the failure item is displayed on the user terminal 12. Although not shown in the drawings, reference data to be used by the user for determining whether or not the repair is requested (for example, data of color comparison between engine oils that is necessary to exchange (service) and that is unnecessary to exchange, and information of what happens when not exchanged), and various buttons similar to those displayed in the failure content explanation window are displayed in this new explanation window.

When the "reference data" button is operated by the user B, a reference data display window as shown in FIG. 13 regarding the vehicle 3 in which the failure is found is displayed on the user terminal 12. In this reference data display window, the service history of the vehicle 3 of the user A, the working conditions of the vehicle 3 such as the mileage and the failure history of the vehicle 3 read from the database 26 are displayed. The user B can determine whether or not the repair is requested by referring these data.

When the "re-advise" button is operated by the user B, a failure occurrence e-mail including the URL for making an access to this failure content explanation window is sent to a user terminal of another user (such as a user C) specified by the user B. Thus, request input processing in which the user C having received this e-mail inputs whether or not the repair is requested is executed.

When the "assist interaction" button is operated, the user terminal 12 of the user B and the user terminal 11 of the user A are mutually connected through the internet, so that the user A and the user B can directly interact to discuss about the repair.

In step S23 of the flowchart shown in FIG. 7, the aforementioned processing is executed in accordance with the operation of the buttons by the user in the failure content explanation window. In subsequent step S24, it is determined whether or not the user has selected requested service by operating the "requested" button or the "unrequested" button or has operated the "reply NG" button. When NO (namely, when none of these buttons is operated), the processing is completed, and when YES (namely, when any of these buttons is operated), the flow proceeds to step S25.

In step S25, the content of the input (namely, "requested", "unrequested" or "reply NG") is received from the user terminal 12 to be stored in the memory 24, and the request input processing is completed.

Referring to the flowchart of the failure diagnosis processing shown in FIG. 6 again, in step S16, the content of the input (the content input by the user B) stored in the memory 24 is sent to the user A by e-mail, and in subsequent step S17, it is determined whether or not the role of the user B is set as an entrusted person. When YES, namely, when the user B is set as an entrusted person, the flow proceeds to step S110, and when NO, namely, when the user B is set as an adviser, the flow proceeds to step S19.

On the other hand, in step S18 proceeded to when neither an adviser nor an entrusted person is set in the item "in failure occurrence" in step S13, a failure occurrence e-mail including a URL is sent to the user A as a permission to browse a failure content explanation window.

In subsequent step S19, request input processing in which the user A inputs whether or not the repair is requested (see FIG. 7) is executed. Thus, even when the role of the user B is set as an adviser and the user B has input whether or not the repair is requested in step S15, the user A inputs whether or not the repair is requested.

In the request input processing executed in this step, the failure content explanation window displayed on the user terminal 11 of the user A is substantially the same as the failure content explanation window (shown in FIG. 12) displayed on the user terminal 12 of the user B, whereas the "reply NG" button and the "re-advise" button are replaced with an "advice" button and an "entrustment" button. When the user A operates the "advice" button or the "entrustment" button, a failure occurrence e-mail including a URL for making an access to this failure content explanation window is sent to the user terminal 12 of a user (such as the user B) specified by the user A. Thus, the user B having received the e-mail inputs whether or not the repair is requested. In this manner, even when neither an adviser nor an entrusted person is set in the item "in failure occurrence" in the advice/entrustment set processing executed in step S1, the user A can specify a third party and can set the role of the third party after grasping the detail of a failure actually found.

In step S110, an estimate is made on the basis of the content of the input of request for the repair stored in the memory 24 in the request input processing executed in step S15 or S19, and the estimate is presented to the user A. The user A ultimately determines whether or not the failure is to be repaired after examining the estimate. In the case where the user decides to have the failure repaired, the user A sets schedule for taking the vehicle 3 to the service shop in a schedule set window not shown in step S111.

In this manner, when the user A specifies the user B in the advice/entrustment setting processing or the failure content explanation window, the failure occurrence e-mail is sent to the user B in the failure diagnosis processing. When the user B makes an access to the URL included in the e-mail, the failure content explanation window is presented, so that the user B can grasp the content of the failure. Then, the user B inputs a reply to the reply item (whether or not the repair is requested) by operating any button in the failure content explanation window. After the user B inputs the reply, the subsequently executed processing depends upon the set role of the user B.

Specifically, when the user A sets the role of the user B as an entrusted person, the content of the reply from the user B is stored in the memory 24 as a user reply, and an estimate is made on the basis of the stored content of the reply. In this case, the user A cannot make a reply to the reply item.

On the other hand, when the user A sets the role of the user B as an adviser, the reply from the user B is provided to the user A, and hence, the user A can ascertain the reply from the user B. Then, the user A makes a reply to the reply item by referring the reply from the user B, and the reply from the user A is stored in the memory 24 as a user reply. An estimate is made on the basis of the stored reply.

Also, even when the role of the user B is set as an entrusted person, the user A can determine whether or not the repair is requested when the estimate is presented, and the user A alone can set the schedule for taking the vehicle to the service shop. In other words, the user A cannot entrust a reply about the schedule and the like to the user B.

In the regular check announcement processing executed in step S3, the user is informed that time of regular check of the vehicle 3 is near. In this regular check announcement processing, the user inputs whether or not the regular check is requested.

Figure 8:
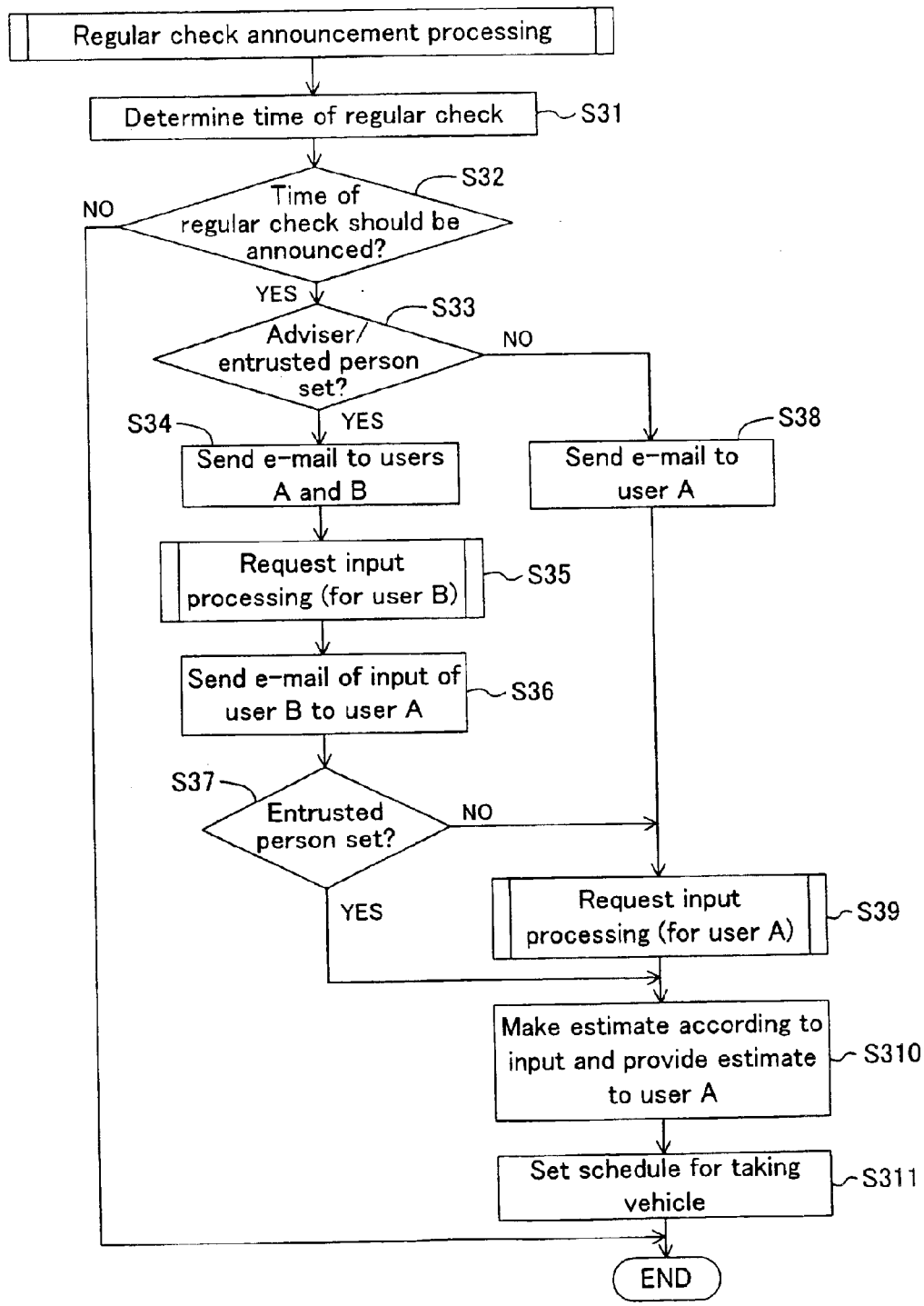
FIG. 8 is a flowchart for showing details of regular check announcement processing.

The details of the regular check announcement processing will now be described with reference to a flowchart shown in FIG. 8. In step S31, the time of announcing regular check is determined on the basis of the information on the service history read from the database 26 and the time of sending a notice of regular check set by the user in the advice/entrustment set window (shown in FIG. 11), and in step S32, it is determined whether or not the time of regular check should be announced. When NO, the processing is completed, and when YES, the flow proceeds to step S33.

In step S33, it is determined whether or not an adviser or an entrusted person is set in the item "before regular check" in the advice/entrustment set processing. When YES, namely, when either is set, the flow proceeds to step S34, and when NO, namely, when neither is set, the flow proceeds to step S38.

In step S34, a regular check announcement e-mail is sent to both the user A and the user B. This announcement e-mail is a notice for permitting to browse a regular check announcement window and includes a URL.

In subsequent step S35, request input processing in which the user B set as the role of an adviser or an entrusted person inputs whether or not the regular check is requested is executed in accordance with the flowchart shown in FIG. 7. Although the regular check announcement window displayed on the user terminal 12 in this processing is omitted, the announcement of the regular check time as well as buttons for inputting request for the regular check (namely, a "requested" button and an "unrequested" button), a "reply NG" button, a "detail" button, a "reference data" button, an "assist interaction" button, a "re-advise" button and the minimum cost of the regular check are displayed in the same manner as in the failure content explanation window (shown in FIG. 12). In this request input processing, the content of the input of the user B (the "requested" or "unrequested" button or the "reply NG" button) is received from the user terminal 12 to be stored in the memory 24 as described above.

In step S36, the content of the input stored in the memory 24 (the content of the reply from the user B) is sent to the user A by e-mail, and in subsequent step S37, it is determined whether or not the role of the user B is an entrusted person. When YES, namely, when the role is set as an entrusted person, the flow proceeds to step S310, and when NO, namely, when the role is set as an adviser, the flow proceeds to step S39.

On the other hand, in step S38 proceeded to when neither an adviser nor an entrusted person is set in the item "before regular check" in step S33, an announcement e-mail including the URL is sent to the user A as a permission to browse the regular check announcement window.

In subsequent step S39, request input processing (see FIG. 7) in which the user A inputs whether or not the regular check is requested is executed. In a regular check announcement window displayed on the user terminal 11 of the user A in this request input processing, a "requested" button, an "unrequested" button, a "detail" button, a "reference data" button and an "assist interaction" button are displayed as in the regular check announcement window displayed on the user terminal 12 of the user B as well as an "advice" button and an "entrustment" button are displayed. Therefore, when the user A operates the "advice" button or the "entrustment" button, the request input processing in which a third party specified by the user A (namely, the user B) inputs whether or not the regular check is requested is executed. Also, when the user A operates the "requested" button or the "unrequested" button, the content of the input (i.e., whether or not the regular check is requested) is received from the user terminal 11 to be stored in the memory 24.

In step S310, an estimate is made in accordance with the content of the input about the request for the regular check stored in the memory 24 in the request input processing executed in step S35 or step S39, and the resultant estimate is presented to the user A. The user A ultimately determines whether or not the regular check is to be performed after examining the estimate. When the regular check is determined to be performed, the user A sets, in step S311, schedule for taking the vehicle 3 to the service shop in a schedule set window not shown.

In this manner, also in the regular check announcement processing, when the user A specifies the user B in the advice/entrustment set processing or the regular check announcement window, the regular check announcement e-mail is sent to the user B as in the failure diagnosis processing. When the user B makes an access to the URL included in this e-mail, the regular check announcement window is presented, so that the user B can grasp the content. The user B inputs a reply to the reply item (whether or not the regular check is requested) by operating any button in this regular check announcement window. After the user B inputs the reply, the processing is executed in accordance with the set role of the user B. Specifically, when the user A specifies the role of the user B as an entrusted person, the reply from the user B is stored in the memory 24 as a user reply, and an estimate is made on the basis of the stored reply. In this case, the user A cannot make a reply to the reply item.

On the other hand, when the user A specifies the role of the user B as an adviser, the reply from the user B is provided to the user A so that the user A can ascertain the reply from the user B. The user A makes a reply to the reply item by referring the reply from the user B, and the reply from the user A is stored in the memory 24 as a user reply. Thus, an estimate is made on the basis of the stored reply.

The check support processing executed in step S4 is executed when the vehicle 3 is taken to the service shop for repairing a failure or for the regular check of the vehicle 3 as described above, and this processing supports the service staff in the check of the vehicle 3. This processing is started when the service staff of the service shop operates the operation switch 44 of the service staff terminal 2 for starting the check, and is specifically executed as follows:

In this processing, check item windows (not shown) each including a check item and an input switch for inputting a check result are successively displayed on the display 43 of the service staff terminal 2. The service staff inputs the check result of each check item in the service staff terminal 2. At this point, when the input check result is that the service is necessary or preferred, an actual image of a check portion necessary to service is captured by the service staff with the camera 25, and the input data of the check result and the actual image are stored in the memory 24. When the service staff has input the check results of all the check items, a service content explanation window is created from the input data of the check results and the actual image(s), and the created window is stored in the memory 24. Thereafter, the processing is completed.

In the check result browse/service content instruction processing executed in step S5, the check results obtained by the service staff through the check support processing are presented to the user, and the user inputs whether or not the service is requested with respect to each check item that is determined to be necessary or preferred to service by the service staff.

Figure 9:
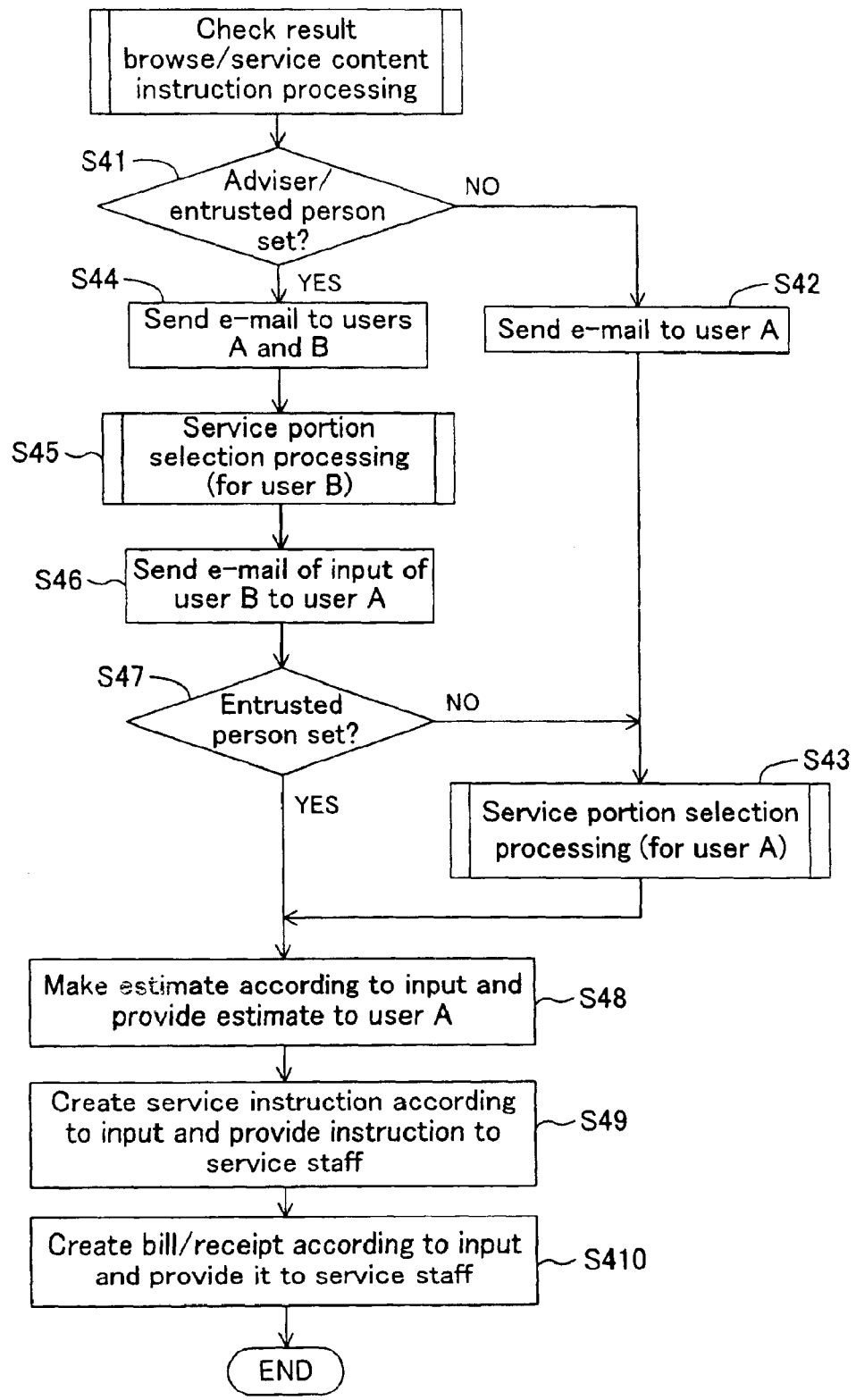
FIG. 9 is a flowchart for showing details of check result browse/service content instruction processing.

The details of the check result browse/service content instruction processing will now be described with reference to a flowchart shown in FIG. 9. In step S41, it is determined whether or not an adviser or an entrusted person is set in the item "after completing check" in the advice/entrustment set processing. When NO, namely, when neither is set, the flow proceeds to step S42, and when YES, namely, when either is set, the flow proceeds to step S44.

In step S42, a check complete e-mail including a URL for accessing the check content explanation window is sent to the user A.

In subsequent step S43, service portion selection processing in which the user A inputs whether or not the service of each check item is requested is executed. This service portion selection processing will be described in detail later.

On the other hand, in step S44, a check complete e-mail is sent to both the user A and the user B, and in step S45, service portion selection processing in which the user B inputs whether or not the service of each check item is requested is executed.

In step S46, the content of selection about request for the service input by the user B in the service portion selection processing executed in step S45 is sent to the user A by e-mail, and in subsequent step S47, it is determined whether or not the role of the user B is set as an entrusted person. When YES, namely, when the role is set as an entrusted person, the flow proceeds to step S48, and when NO, namely, when the role is set as an adviser, the flow proceeds to step S43. When the flow proceeds to step S43, the service portion selection processing for the user A is executed, so that the user A can input whether or not the service of each check item is requested.

In step S48, an estimate of the cost of the check/service of the vehicle 3 is made on the basis of the content of the selected request input in the service portion selection processing executed in step S43 or step S45, and the resultant estimate is sent to the user terminal 11. Thus, the user A can ultimately ascertain the content of the service. Even in the case where the role of the user B is set as an entrusted person, the user A ultimately determines whether or not the service is requested after examining the estimate.

In subsequent step S49, a service instruction regarding the vehicle for the service staff is created on the basis of the content of selected service need portions, and the resultant service instruction is sent to the service staff terminal 2. Thus, the service staff can ultimately ascertain the portions to be serviced.

In subsequent step S410, a bill or a receipt regarding the check/service of the vehicle is created on the basis of the content of the selected service need portions, and the resultant bill or receipt is sent to the service staff terminal 2, and then, the processing is completed. The service staff gives the bill to the user when the vehicle is taken after the service or gives the receipt to the user on payment.

Figure 10:
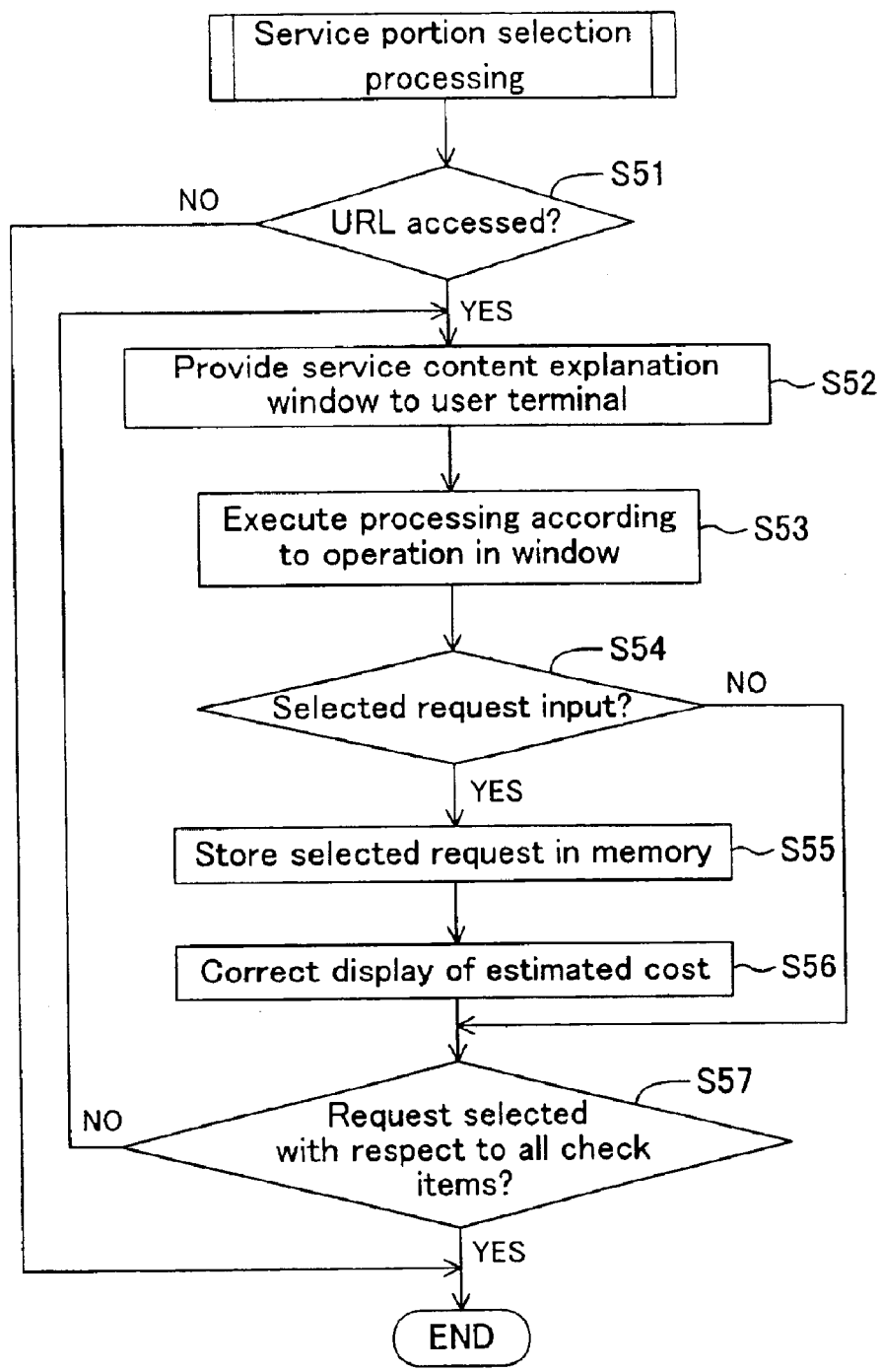
FIG. 10 is a flowchart for showing details of service portion selection processing.

Next, the service portion selection processing executed in step S43 or step S45 will be described with reference to a flowchart shown in FIG. 10.

First, in step S51, it is determined whether or not an access (browse request) has been made to the URL included in the check complete e-mail sent to the user A or the user B in step S42 or step S45. When NO, the processing is completed. When YES, the flow proceeds to step S52, in which the service content explanation window is displayed on the user terminal 11 or 12 operated by the user. In step S53, processing in accordance with a button operated by the user in the service content explanation window is executed.

FIG. 14 shows an example of the service content explanation window. This is an example of the service content explanation window in which the user A inputs whether or not the service is requested, and with respect to each check item, a service need portion found by the service staff, the brief explanation and the estimated cost are displayed. With respect to a check item that is determined by the service staff to be necessary or preferred to service, a "requested" button (which is operated when the service is selected) and an "unrequested" button (which is operated when the service is not selected) for inputting, by the user A, the request for the service of the service need portion corresponding to the check item, a "detail" button, an "advice" button, an "entrustment" button, the cost of the service of the check item and the like are displayed. As the estimated cost, a value obtained by assuming the service is selected is displayed before operating any button, and when the user A decides not to request the service (operates the "unrequested" button), the estimated cost is corrected by subtracting the cost of the service of the check item and the corrected cost is displayed.

Figure 15:
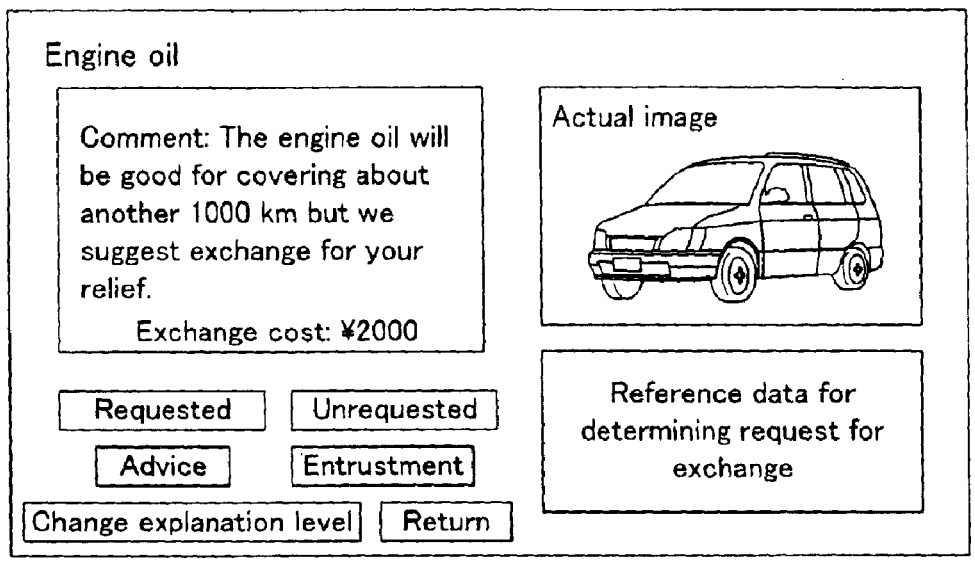
FIG. 15 is a diagram for showing an example of a service content detail window displayed on a display of a user terminal.

When the "detail" button is operated by the user A, a service content detail window regarding the corresponding check item (the service need portion) as shown in FIG. 15 (exemplifying a window for the engine oil) is displayed on the user terminal 11.

In the service content detail window, the actual image of the check item (the service need portion) captured by the service staff, reference information to be employed by the user for determining whether or not the service is requested (for example, with respect to the engine oil, information of the color comparison between an engine oil necessary to exchange (service) and an engine oil unnecessary to exchange, and what happens if not exchanged), a comment input by the service staff, and the selection buttons the same as those displayed in the service content explanation window are displayed.

In step S54, it is determined whether or not the user has made the selection of the service (by operating the "requested" button or the "unrequested" button). When NO (namely, when neither button is operated), the flow proceeds to step S57, and when YES (namely, either button is operated), the flow proceeds to step S55.

In step S55, the content of the selection (whether or not the service is requested) is received from the user terminal 11 and stored in the memory 24, and in subsequent step S56, the display of the estimated cost is corrected, and then, the flow proceeds to step S57.

In step S57, it is determined whether or not the selection of the request for the service has been made with respect to all the service need portions, or whether or not an "end" button displayed in the service content explanation window has been operated. When NO, the flow returns to step S52, and when YES, the processing is completed.

In this manner, also in the check result browse/service content instruction processing, when the user A specifies the user B in the advice/entrustment set processing, the check complete e-mail is sent to the user B. When the user B makes an access to the URL included in this e-mail, the service content explanation window is presented, so that the user B can grasp the content of the service. The user B inputs a reply to the reply item (whether or not the service is requested) by operating any button in the service content explanation window. After the user B inputs the reply, the processing is proceeded in accordance with the set role of the user B. When the user A specifies the role of the user B as an entrusted person, the reply from the user B is stored in the memory 24 as a user reply, and an estimate is made on the basis of the stored reply. In this case, the user A cannot make a reply to the reply item.

On the other hand, when the user A specifies the role of the user B as an adviser, the reply from the user B is provided to the user A, so that the user A can ascertain the reply from the user B. The user A makes a reply to the reply item by referring the reply from the user B, and the reply from the user A is stored in the memory 24 as a user reply. Then, an estimate is made on the basis of the stored reply.

Figure 16:
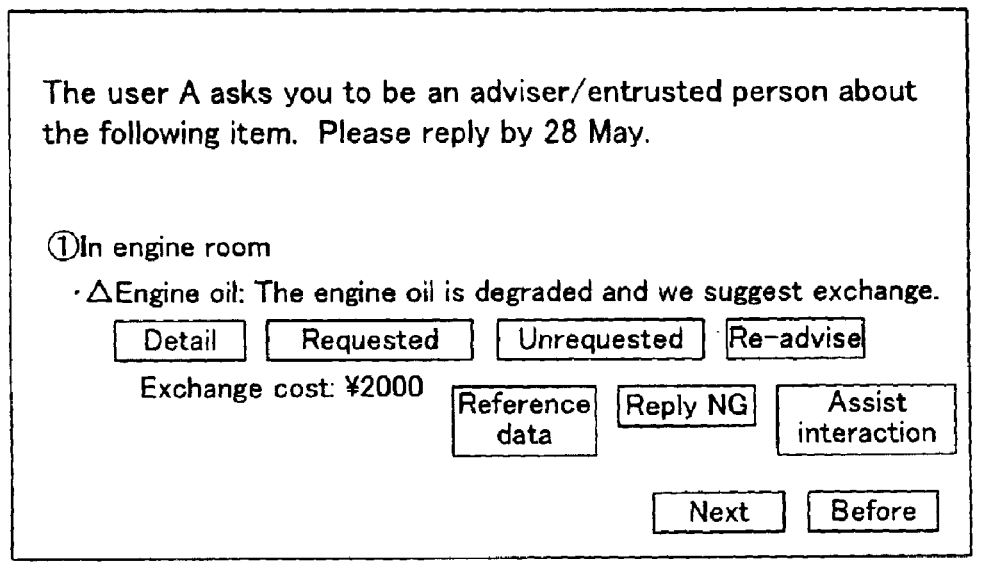
FIG. 16 is a diagram for showing an example of a second service content explanation window displayed on a display of a user terminal.

When the user A operates the "advice" button or the "entrustment" button in the service content explanation window shown in FIG. 14 or the service content detail window shown in FIG. 15, the user A can ask for advice for or entrust a third party in the determination of the request for the service of the corresponding check item. Specifically, when the "advice" button or the "entrustment" button is operated by the user A, an e-mail including a URL is sent as a notice of browse permission to the user terminal 12 of another user (such as the user B) specified by the user A. When the user B makes an access to the URL, a second service content explanation window as shown in FIG. 16 is displayed on the user terminal 12 of the user B. Thus, in the service content explanation window and the service content detail window, the user A can specify a third party with respect to each check item (i.e., with respect to each reply item) (and in this case, different third parties can be specified with respect to the respective check items) and set the role of each third party.

In the second service content explanation window, with respect to the check item about which the user B is specified as the role of an adviser or an entrusted person, the service need portion found by the service staff and the brief explanation, a "requested" button and an "unrequested" button, a "detail" button, a "re-advise" button, a "reply NG" button, a "reference data" button, an "assist interaction" button, the cost for the service of the check item and the like are displayed.

When the "detail" button is operated by the user B, the service content detail window (as shown in FIG. 15) is displayed on the user terminal 12, and when the "reference data" button is operated by the user B, the reference data display window (as shown in FIG. 13) is displayed on the user terminal 12.

When the "re-advise" button is operated by the user B, an e-mail including the URL for accessing this second service content explanation window is sent to the user terminal of another user (such as a user C) specified by the user B. Thus, the user C having received the e-mail inputs whether or not the service of the check item is requested.

When the "assist interaction" button is operated by the user B, the user terminal 12 of the user B and the user terminal 11 of the user A are mutually connected through the internet, so that the user A and the user B can directly interact to discuss about the request for the service.

When the "requested" button, the "unrequested" button or the "reply NG" button is operated by the user B, the content of the operation is stored in the memory 24 as well as sent to the user A by e-mail. When the role of the user B is set as an entrusted person, the user A cannot input whether or not the service of the check item is requested while when the role of the user B is set as an adviser, the user A inputs whether or not the service of the check item is requested.

As described so far, according to the embodiment, at respective times of failure occurrence, announcing regular check time or informing the result of check actually performed on the vehicle by the service staff, an e-mail (a notice of browse permission) is sent to the user A, and when the user A makes an access to a URL included in the e-mail, the failure content explanation window, the regular check announcement window or the service content explanation window is provided to the user terminal 11. Therefore, the user A can remotely ascertain these service information. Also, the user A can remotely make a reply about the service information by operating any of various buttons displayed in each of these windows.

Also, when the user A that is an owner of the vehicle 3 previously specifies the user B in the advice/entrustment set processing, an e-mail (a notice of browse permission) is also sent to the specified user B at the time of failure occurrence, announcing the regular check time or informing the result of check performed by the service staff. When the user B makes an access to a URL included in the e-mail, the failure content explanation window, the regular check announcement window or the service content explanation window is provided to the user terminal 12. Thus, also the user B can remotely ascertain the service information. Since the user B can be thus directly provided with the service information not through the user A, the user B can accurately grasp the service information.

Also, since the e-mail is not sent to any person other than the specified user B, another person cannot browse the service content explanation window and the like, and thus, the security can be ensured.

Furthermore, since each of the user A and the user B can make an access to the URL at his/her own convenience, the user A and the user B can ascertain the service information in the respective windows without any time and locational restrictions.

Moreover, even when the user B is not previously specified in the advice/entrustment set processing, the user A can set the user B as an adviser or an entrusted person after examining the service information by operating the "advice" button or the "entrustment" button in each of the failure content explanation window, the regular check announcement window and the service content explanation window.

In particular, in the service content explanation window and the like, a third party and his/her role can be specified with respect to each check item. Therefore, the user A can set a third party and his/her role suitable to each check item after grasping the service content, which can improve the convenience for the user.

When the user B that has been provided with the failure content explanation window, the regular check announcement window or the service content explanation window makes a reply to a reply item, the user B can make the reply merely by operating any button in each window.

Also, when the user B operates the "reference data" button in each of the windows, reference information such as the service history, the failure history and the working conditions of the vehicle 3 of the user A is provided to the user B. The user B can make a more appropriate reply by referring these information. Furthermore, when the user B operates the "assist interaction" button in each window, the user A and the user B can directly interact with each other, so that a reply to the reply item can be more appropriately made.

In the case where the role of the user B is set as an entrusted person, the reply from the user B made in each window is stored in the memory 24 as a user reply, and the vehicle is serviced (maintained or repaired) in accordance with the reply in the service shop. In this case, the user A cannot make a reply about the service information, and hence, inconsistency between the reply from the user A and the reply from the user B can be avoided.

Furthermore, even when the role of the user B is set as an entrusted person, the user A can ultimately decides whether or not the service is requested after examining an estimate made on the basis of the reply from the user B, and the schedule for taking the vehicle to the service shop can be set by the user A alone. In other words, the user A cannot entrust all the reply items to the user B. Therefore, the user B, that is, a third party, cannot make a reply to a reply item that should be determined by the user A, that is, the owner of the vehicle, which can improve the convenience for the user A.

In contrast, when the role of the user B is set as an adviser, the reply from the user B made in each window is provided to the user A, and therefore, the user A can make a reply about the service information after ascertaining the reply from the user B.

In this manner, according to the embodiment, even if the user A has little knowledge of vehicle mechanics, when the user B, that is, a third party, and his/her role are specified, the user A can appropriately make a reply about service information while supported by the user B.

In this embodiment, an e-mail (a notice of browse permission) is sent to a user at the times of failure occurrence, announcing the regular check time or completing the check by the service staff, so that each window can be browsed by making an access (a browse request) to a URL included in the e-mail. However, without sending the notice of browse permission, each window may be sent to the user by e-mail. In this case, preferably, the e-mail is accompanied by a URL for allowing the user to input a reply, and when the user makes an access to the URL and inputs a reply, the input is automatically received.

What is claimed is:

1. A vehicle service support system for enabling a user to remotely reply about service information of a vehicle, comprising a computer apparatus connected to a communication line for performing information processing online, wherein said computer apparatus includes:

a specifying section for allowing a first user that owns said vehicle to specify a second user different from said first user;

an information providing section for providing said second user specified by said first user with service information of said vehicle of said first user through said communication line; and a reply inputting section for allowing said second user having been provided with said service information to input a reply to a reply item about said service information.

2. The vehicle service support system of claim 1, wherein said computer apparatus further includes a reply providing section for providing said first user with said reply having been input by said second user through said communication line, and said reply inputting section allows said first user having been provided with said reply to input a reply to said reply item about said service information and stores said reply input by said first user as a user reply about said service information.

3. The vehicle service support system of claim 1, wherein said service information is at least one of service content information obtained as a result of check of said vehicle performed by service staff, information on regular check of said vehicle, and repair content information for repairing a failure having occurred in said vehicle.

4. The vehicle service support system of claim 1, wherein said computer apparatus further includes a permission notice transmitting section for transmitting, through said communication line, a notice for permitting to browse a service information window to said second user specified by said first user, and said information providing section provides said service information window to said second user in response to a browse request from said second user having received said notice.

5. The vehicle service support system of claim 1, wherein said information providing section provides working conditions of said vehicle in addition to said service information to said second user.

6. The vehicle service support system of claim 1, wherein said computer apparatus further includes an interaction assisting section for allowing said second user and said first user to interact with each other through said communication line in response to a request from said second user having been provided with said service information.

7. The vehicle service support system of claim 1, wherein said reply inputting section inhibits said second user from inputting a reply to a given reply item out of all reply items about said service information and allows said first user to input a reply to said given reply item to which said second user is inhibited from replying.

8. The vehicle service support system of claim 7, wherein said given reply item is a date of taking said vehicle to a shop where said vehicle is to be serviced.

9. The vehicle service support system of claim 1,
wherein said specifying section allows said first user to specify said second user different from said first user and allows said first user to set a role of said specified second user as an adviser for asking for advice about a reply to said reply item or as an entrusted person for entrusting a reply to said reply item, and
said computer apparatus further includes a reply processing section for processing said reply input by said second user in accordance with said set role of said second user.

10. The vehicle service support system of claim 9,
wherein said reply processing section provides, when said role of said second user is set as an adviser, said reply input by said second user to said first user through said communication line, allows said first user having been provided with said reply from said second user to input a reply to said reply item and stores said reply input by said first user as a user reply about said service information.

11. The vehicle service support system of claim 10,
wherein said reply processing section stores said reply input by said second user as a user reply about said service information when said role of said second user is set as an entrusted person.

12. The vehicle service support system of claim 11,
wherein said reply processing section inhibits said first user from inputting a reply to said reply item when said role of said second user is set as an entrusted person.

13. The vehicle service support system of claim 9,
wherein said reply processing section stores said reply input by said second user as a user reply about said service information when said role of said second user is set as an entrusted person.

14. The vehicle service support system of claim 13,
wherein said reply processing section inhibits said first user from inputting a reply to said reply item when said role of said second user is set as an entrusted person.

15. The vehicle service support system of claim 9,
wherein said information providing section provides said first user with said service information about said vehicle of said first user through said communication line, and
said specifying section allows said first user to specify said second user and a role of said specified second user after providing said service information to said first user.

16. The vehicle service support system of claim 9,
wherein when there are a plurality of reply items, said specifying section allows said first user to specify different second users with respect to said plurality of reply items and specify different roles with respect to said different second users.

17. The vehicle service support system of claim 16,
wherein said specifying section inhibits said first user from specifying said roles of said second users as an entrusted person with respect to all of said plurality of reply items.

18. The vehicle service support system of claim 17,
wherein said specifying section inhibits said first user from specifying said role of said second user as an entrusted person with respect to a reply item of a date of taking said vehicle to a shop where said vehicle is to be serviced.

19. A vehicle service support system for enabling a user to remotely reply about service information of a vehicle through a communication line, comprising:

specifying means for allowing a first user that owns said vehicle to specify a second user different from said first user;
information providing means for providing said second user specified by said first user by using said specifying means with said service information of said vehicle of said first user through said conununication line; and
reply inputting means for allowing said second user having been provided with said service information to input a reply to a reply item about said service information.

20. The vehicle service support system of claim 19,
wherein said specifying means allows said first user to specify said second user different from said first user and allows said first user to set a role of said specified second user as an adviser for asking for advice about a reply to said reply item or as an entrusted person for entrusting a reply to said reply item, and
said vehicle service support system further comprises reply processing means for processing said reply input by said second user in accordance with said set role of said second user.

21. A vehicle service support server connected to a remote terminal through a communication line for enabling a user to remotely reply about service information of a vehicle, comprising:
a specifying section for allowing a first user that owns said vehicle to specify a second user different from said first user in a first remote terminal operated by said first user;
an information providing section for providing a second remote terminal operated by said second user specified by said first user with said service information of said vehicle of said first user through said communication line; and
a reply inputting section for allowing said second user having been provided with said service information to input a reply to a reply item about said service information in said second remote terminal.

22. The vehicle service support server of claim 21,
wherein said specifying section allows said first user to specify said second user different from said first user and allows said first user to set a role of said specified second user as an adviser for asking for advice about a reply to said reply item or as an entrusted person for entrusting a reply to said reply item, and
said vehicle service support server further comprises a reply processing section for processing said reply input by said second user in accordance with said set role of said second user.

23. A vehicle service support method for enabling a user to remotely reply about service information of a vehicle through a communication line, comprising:
a specifying step of allowing a first user that owns said vehicle to specify a second user different from said first user;
an information providing step of providing said second user specified by said first user with said service information of said vehicle of said first user through said communication line; and
a reply inputting step of allowing said second user having been provided with said service information to input a reply to a reply item about said service information.

24. The vehicle service support method of claim 23,
wherein in the specifying step, said first user is allowed to specify said second user different from said first user and is allowed to set a role of said specified second user as an adviser for asking for advice about a reply to said reply item or as an entrusted person for entrusting a reply to said reply item, and said vehicle service support method further comprises a reply processing step of processing said reply input by said second user in accordance with said set role of said second user.

25. A vehicle service support program for controlling a vehicle service support apparatus connected to a communication line for enabling a user to remotely reply about service information of a vehicle, said vehicle service support program making said vehicle service support apparatus execute:

specifying processing for allowing a first user that owns said vehicle to specify a second user different from said first user;

information providing processing for providing said second user specified by said first user with said service information of said vehicle of said first user through said communication line; and reply inputting processing for allowing said second user having been provided with said service information to input a reply to a reply item about said service information.

26. The vehicle service support program of claim 25, wherein in said specifying processing, said first user is allowed to specify said second user different from said first user and is allowed to set a role of said specified second user as an adviser for asking for advice about a reply to said reply item or as an entrusted person for entrusting a reply to said reply item, and said vehicle service support program further makes said vehicle service support apparatus execute reply processing for processing said reply input by said second user in accordance with said set role of said second user.

* * * * *